2,820,739
// Patented Jan. 21, 1958

2,820,739

ANTITUSSIVE COMPOSITIONS

Horace D. Brown, Plainfield, N. J., assignor to Merck & Co., Inc., Rahway, N. J., a corporation of New Jersey No Drawing. Continuation of abandoned application Serial No. 428,373, May 7, 1954. This application September 5, 1956, Serial No. 608,004

9 Claims. (Cl. 167—65)

This invention relates to new antitussive preparations for oral administration. More particularly the invention relates to antitussive compositions which comprise mixtures of an orally administrable pharmaceutical carrier and as active antitussive agent a substituted β-aminoethyl benzene compound. The present application is a continuation of my pending application Serial No. 428,373, filed May 7, 1954, now abandoned.

The management of unproductive or useless cough has in the past been handled with antitussive preparations which generally contain as the active antitussive agent one of the potent analgesic drugs such as morphine, codeine, and the like. While such preparations are reasonably effective they possess the inherent disadvantages characteristic of the potent analgesic drugs such as objectionable side reactions and addiction liability.

I have now discovered that potent antitussive compositions can be prepared utilizing as active antitussive agents certain substituted β-aminoethyl benzene compounds which have no analgesic activity and which are free of the above mentioned disadvantages which characterize the potent analgesics. The active substances in these new compositions can be represented by the formula

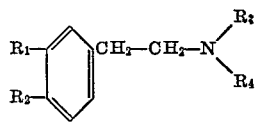

wherein $R_1$ and $R_2$ can individually comprise different monovalent radicals selected from the group consisting of hydroxy and lower alkoxy radicals and can collectively comprise a divalent radical selected from the group consisting of methylenedioxy and ethylenedioxy radicals, and wherein $R_3$ and $R_4$ are each selected from the group consisting of hydrogen and methyl radicals.

In more descriptive terms the active substances, which can be utilized in the form of either the free base or an acid salt, includes the following aralkylamines and their N-methyl and N,N-dimethyl derivatives:

3-lower alkoxy-4-hydroxy-β-aminoethyl benzene
3-hydroxy-4-lower alkoxy-β-aminoethyl benzene
3,4-methylenedioxy-β-aminoethyl benzene
3,4-ethylenedioxy-β-aminoethyl benzene A number of the individual compounds embraced in the foregoing group have been disclosed in the literature, and the remainder, although not specifically described in the literature, are prepared by directly analogous methods. Conversion of the primary amines or N-methyl compounds to the N,N-dimethyl compounds is effected by standard methylation procedures, as for example by reaction with formic acid followed by reduction with lithium aluminum hydride.

The preferred compounds for use in the new antitussive compositions are those of the N-methyl series. The primary amines do not appear to be quite as effective as the substituted amines, and while the N-methyl and N-N-dimethyl amines are about equal in effectiveness the N-methyl compounds are substantially less costly to prepare. Of primary interest to date has been the N-methyl derivative of 3,4-methylenedioxy-β-aminoethyl benzene, also known as N-methylhomopiperonylamine.

When antitussive activity of the various compounds is compared by tests with dogs and with guinea pigs it is found that the activity ranges from moderate to good and very good at doses of 4 to 8 mg./kg. of body weight.

In preparing antitussive compositions in accordance with the present invention a substituted β-aminoethyl benzene compound of the type above described is combined preferably in the form of an acid addition salt with a pharmaceutical carrier suitable for oral administration. The compositions can be prepared, for example, as tablets, capsules, or powders by combining the active components with solid diluents and/or tableting adjuvants such as lactose, starch, magnesium stearate, and the like. The compositions can also be prepared as syrups or elixirs by combining the active components with suitable liquid diluents or carriers including, if desired, sweetening and flavoring agents.

The amount of active components to be included in unit dose oral preparations such as tablets, capsules, and the like, may be varied widely. It is ordinarily preferred to utilize formulations containing from about 5 to 50 mg. of antitussive since this provides a convenient single dose. Clinical tests have indicated that about 15–30 mg. of active component per unit dose provides an effective antitussive preparation for the average adult. It is preferred to use the antitussives in the form of their acid salts such as the hydrochloride, sulfate, citrate, phosphate. The salts are significantly more water soluble than the free base and also more readily handled.

The following examples will show how typical antitussive preparations in accordance with my invention can be made, but it is to be understood that these examples are given by way of illustration and not of limitation.

Example I

Tablets of N-methyl-3,4-methylenedioxy-β-aminoethyl benzene are prepared containing per 150 mg. tablet:

| | Mg. |
|---|---|
| N - methyl - 3,4 - methylenedioxy - β - aminoethyl benzene hydrochloride | 20 |
| Starch | 15 |
| Magnesium stearate | 1.5 |
| Granules | 113.5 |

The granules are made of about 91.5% lactose, 7% starch, 1.5% sucrose. The antitussive agent, the starch (disintegrating agent) and the magnesium stearate (lubricant) are thoroughly mixed with the granules and the resulting mixture tableted.

Example II

Tablets of N,N-dimethyl-3,4-methylenedioxy-β-aminoethyl benzene are prepared containing per 250 mg. tablet:

| | Mg. |
|---|---|
| N,N - dimethyl - 3,4 - methylenedioxy - β - aminoethyl benzene citrate | 40 |
| Lactose | 15 |
| Magnesium stearate | 2.5 |
| Granules (as in Example I) | 192.5 |

The components are mixed together and tableted as described in Example I.

Example III

An antitussive preparation in the form of a powder is prepared by mixing about 50 parts by weight of 3-methoxy-4-hydroxy-β-aminoethyl benzene hydrochloride (or other active agent as herein disclosed) with about 450 parts by weight of lactose. This mixture can be utilized as such or can be put in unit dose form.

*Example IV*

A 400 mg. capsule of N-methyl-3,4-methylenedioxy-β-aminoethyl-benzene-phosphate is prepared by intimately admixing 30 mg. of active ingredient and 370 mg. of lactose, and filling gelatin capsules with the resulting mixture. A few drops of mineral oil is added to the mixture to facilitate packing of the capsule.

*Example V*

A 300 mg. capsule of N-methyl-3,4-ethylenedioxy-β-amino-ethyl-benzene is compounded by admixing 25 mg. of antitussive agent and 275 mg. of sucrose. Gelatin capsules of a suitable size are then packed with the composition.

*Example VI*

An antitussive syrup is prepared by combining together the following components in approximately the amounts indicated:

N-methyl-3,4-methylenedioxy-β-aminoethyl benzene
  hydrochloride _____mg__ 280
Expectorant (potassium guaicol sulfonate) percent__ 2
Simple syrup of cherry_____do____ 25
Glycerine _____do____ 10
Distilled water, to 100 ml. (100%).

In this syrup other antitussive agents as herein disclosed in the form of their acid salts can be substituted for the N-methyl-3,4-methylenedioxy-β-aminoethyl benzene hydrochloride and the quantity of active agent can be varied from about 100 to 500 mg. Other components of the syrup can also be varied. The amount of glycerine may be 5 to 25% with a proportional change in the amount of simple syrup. The amount of expectorant may range from about 1 to 3% and the amount and type of flavoring agent can be freely modified to give a desired taste or flavor to the syrup.

*Example VII*

The antitussive syrup is prepared by combining together the following components in approximately the amounts indicated:

N-methyl-3-hydroxy-4-methoxy-β-aminoethyl benzene hydrochloride_____mg___ 250
Expectorant (potassium guaicol sulfate)__percent__ 2
Simple syrup of raspberry_____do____ 20
Glycerine _____do____ 15
Distilled water, to 100 mg. (100%).

*Example VIII*

An antitussive elixer is prepared by combining together the following components in approximately the amounts indicated:

N-methyl-3,4-methylenedioxy-β-aminoethyl benzene
  hydrochloride _____mg____ 280
Simple syrup U. S. P_____percent__ 33
Imitation cherry flavor_____do____ 0.07
Ethyl alcohol (95%)_____do____ 30
Distilled water, to 100 ml. (100%).

The active antitussive agent can be varied as described in Example VI, and likewise the amount of alcohol can be varied from about 10 to 50%. As in the case of a syrup, the type and amount of flavoring agent will depend on the particular taste or flavor desired in the elixir.

Various changes and modifications in the new antitussive compositions herein disclosed may occur to those skilled in the art, and to the extent that such changes and modifications are embraced by the appended claims, it is to be understood that they constitute part of my invention.

I claim:

1. An antitussive composition comprising in combination with an orally administrable pharmaceutical carrier, a substance selected from the group consisting of substituted β-aminoethyl benzene compounds of the formula

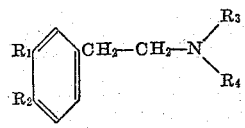

wherein the substituents $R_1$ and $R_2$ are selected from the group consisting of different monovalent hydroxy and lower alkoxy radicals and divalent radical selected from the group consisting of methylenedioxy and ethylenedioxy radicals, and wherein the substituents $R_3$ and $R_4$ are each selected from the group consisting of hydrogen and methyl radicals and acid salts thereof, said composition containing per dosage unit about 5 to 50 mg. of said substance.

2. An antitussive composition as defined in claim 1 wherein the carrier is in the form of a dry solid.

3. An antitussive composition as defined in claim 1 wherein the carrier is in the form of a liquid.

4. An oral antitussive preparation comprising N-methyl 3,4-methylenedioxy-β-aminoethyl benzene, in the form of an acid salt, and a pharmaceutical carrier, said preparation containing per dosage unit about 5 to 50 mg. of said acid salt.

5. An oral antitussive preparation comprising N,N-dimethyl 3,4-methylenedioxy-β-aminoethyl benzene, in the form of an acid salt, and a pharmaceutical carrier, said preparation containing per dosage unit about 5 to 50 mg. of said acid salt.

6. An oral antitussive preparation comprising N-methyl-3,4-ethylenedioxy-β-aminoethyl benzene, in the form of an acid salt, and a pharmaceutical carrier, said preparation containing per dosage unit about 5 to 50 mg. of said acid salt.

7. An oral antitussive preparation comprising 3-methoxy-4-hydroxy-β-aminoethyl benzene, in the form of an acid salt, and a pharmaceutical carrier, said preparation containing per dosage unit about 5 to 50 mg. of said acid salt.

8. An oral antitussive preparation comprising N-methyl-3-methoxy-4-hydroxy-β-aminoethyl benzene, in the form of an acid salt, and a pharmaceutical carrier, said preparation containing per dosage unit about 5 to 50 mg. of said acid salt.

9. An antitussive composition as defined in claim 1 containing per dosage unit about 15 to 30 mg. of said substance.

References Cited in the file of this patent

UNITED STATES PATENTS 1,073,966    Decker _____ Sept. 23, 1913

OTHER REFERENCES

Chem. Abst., vol. 33, 1939, p. 5519³.
Gutman: Modern Drug Encycl., Am. J. of Surgery, Inc., N. Y. C., 1934, pp. 103–104.